(12) United States Patent
Kao et al.

(10) Patent No.: US 10,688,723 B2
(45) Date of Patent: Jun. 23, 2020

(54) POWDER SPREADER HAVING AUTOMATIC POWDER RECOVERY

(71) Applicant: TONGTAI MACHINE & TOOL CO., LTD., Luzhu Kaohsiung (TW)

(72) Inventors: Huaien Kao, Luzhu Kaohsiung (TW); Hsinpao Chen, Luzhu Kaohsiung (TW); Juihsiung Yen, Luzhu Kaohsiung (TW)

(73) Assignee: TONGTAI MACHINE & TOOL CO., LTD., Luzhu Kaohsiung (TW)

( * ) Notice: Subject to any disclaimer, the term of this patent is extended or adjusted under 35 U.S.C. 154(b) by 0 days.

(21) Appl. No.: 16/347,041

(22) PCT Filed: Nov. 15, 2016

(86) PCT No.: PCT/CN2016/105917
§ 371 (c)(1),
(2) Date: May 2, 2019

(87) PCT Pub. No.: WO2018/090188
PCT Pub. Date: May 24, 2018

(65) Prior Publication Data
US 2019/0255775 A1 Aug. 22, 2019

(51) Int. Cl.
*B29C 64/357* (2017.01)
*B29C 64/153* (2017.01)
(Continued)

(52) U.S. Cl.
CPC .......... *B29C 64/357* (2017.08); *B29C 64/153* (2017.08); *B29C 64/214* (2017.08); *B29C 64/232* (2017.08); *B29C 64/236* (2017.08); *B29C 64/25* (2017.08); *B29C 64/268* (2017.08); *B29C 64/329* (2017.08); *B29C 67/04* (2013.01); *B22F 2003/1056* (2013.01);
(Continued)

(58) Field of Classification Search
CPC ..... B29C 64/357; B29C 67/04; B29C 64/232; B29C 64/268; B29C 64/236; B29C 64/25; B29C 64/214; B29C 64/329; B29C 64/153; B22F 2003/1059; B22F 2003/1056; B22F 3/1055; Y02P 10/295; B33Y 40/00; B33Y 30/00; B33Y 40/20
See application file for complete search history.

(56) References Cited

U.S. PATENT DOCUMENTS 5,252,264 A 10/1993 Forderhase et al.
5,269,982 A 12/1993 Brotz
(Continued)

FOREIGN PATENT DOCUMENTS

CN 2936746 Y 8/2007
CN 201300207 Y 9/2009
(Continued)

*Primary Examiner* — Nahida Sultana
(74) *Attorney, Agent, or Firm* — Muncy, Geissler, Olds & Lowe, P.C.

(57) ABSTRACT

A powder spreader having automatic powder recovery, comprising: a powder spreading unit (2), a powder collecting unit (3) and a moving unit (4), wherein the powder collecting unit (3) is provided with a base body (31), a working tank (32) and at least one recovery tank (33); powder may be automatically recovered by using a design of the recovery tank and the moving unit.

10 Claims, 6 Drawing Sheets

(51) Int. Cl.
    *B29C 64/329* (2017.01)
    *B29C 64/214* (2017.01)
    *B29C 64/25* (2017.01)
    *B29C 64/236* (2017.01)
    *B29C 64/268* (2017.01)
    *B29C 64/232* (2017.01)
    *B29C 67/04* (2017.01)
    *B33Y 30/00* (2015.01)
    *B33Y 40/00* (2020.01)
    *B22F 3/105* (2006.01)

(52) U.S. Cl.
    CPC ....... *B22F 2003/1059* (2013.01); *B33Y 30/00* (2014.12); *B33Y 40/00* (2014.12); *Y02P 10/295* (2015.11)

(56) References Cited

U.S. PATENT DOCUMENTS

| | | |
|---|---|---|
| 7,887,316 B2 | 2/2011 | Cox |
| 8,523,554 B2 | 9/2013 | Tung et al. |
| 9,586,365 B2 | 3/2017 | Chen et al. |
| 2005/0225007 A1* | 10/2005 | Lai ........................ B33Y 30/00 264/308 |
| 2015/0202687 A1 | 7/2015 | Pialot et al. |
| 2016/0067929 A1 | 3/2016 | Park |
| 2016/0271887 A1 | 9/2016 | Shi et al. |

FOREIGN PATENT DOCUMENTS

| | | |
|---|---|---|
| CN | 101850326 A | 10/2010 |
| CN | 201685457 U | 12/2010 |
| CN | 204799942 U | 11/2015 |
| CN | 205238581 U | 5/2016 |
| CN | 105903965 A | 8/2016 |
| EP | 2732890 A3 | 12/2014 |
| JP | H07501019 A | 2/1995 |
| JP | 2006248231 A | 9/2006 |
| JP | 2008050671 A | 3/2008 |
| TW | 201208870 A | 3/2012 |
| TW | 201540353 A | 11/2015 |

\* cited by examiner

POWDER SPREADER HAVING AUTOMATIC POWDER RECOVERY

FIELD OF INVENTION

The present disclosure relates to a paving apparatus for recycling powder, and in particular to the paving apparatus for automatically recycling powder applied in three-dimensional (3D) printing.

BACKGROUND OF INVENTION

A main technical content of three-dimensional rapid prototyping (3D printing) is to put data and raw materials into 3D printers, and a product is to print layer by layer through a powder spreading device to form a final product. The 3D printing mainly includes selective laser sintering (SLS), selective laser melting (SLM), direct metal laser sintering (DMLS), electron beam melting (EBM), and other technologies. SLS uses a low-power laser to sinter low-melting polymer powder. SLM uses a high-energy beam laser to directly melt metal powder. DMLS uses a laser to sinter binary metal. EBM uses an electron beam to melt metal powder.

However, in the field of the 3D printers, existing paving devices are generally manually replaced with powder for recycling. A paving operation must be completed on a platform, and the remaining powder can be manually cleaned and recycled. The whole process is time-consuming and laborious, which easily affects the processing efficiency of the product.

As a result, it is necessary to provide a paving apparatus for automatically recycling powder to solve the problems existing in the conventional technologies, as described above.

SUMMARY OF INVENTION

An object of the present disclosure is to provide a paving apparatus for automatically recycling powder, wherein remaining powder can be automatically recycled through designing the recycling tanks and a moving unit.

To achieve the above object, the present disclosure provides a paving apparatus for automatically recycling powder. The paving apparatus is configured to spread a powder and recycle the powder in a 3D printer, and comprises a paving unit, a powder collecting unit, and a moving unit, wherein the paving unit includes a platform, a shifter disposed on the platform, and a powder spreader assembled on the shifter and configured to pave the powder on the platform, wherein the platform includes a working hole configured to provide a laser emitter for processing a shaped object, and at least one recycling hole configured to recycle the powder; the powder collecting unit is disposed below the platform, wherein the powder collecting unit includes a body, a working tank disposed on the body and corresponding to the working hole for receiving the shaped object, and at least one recycling tank disposed on the body and corresponding to the recycling tank; the moving unit including a base and a lifting mechanism, wherein the lifting mechanism is disposed on the base and configured to drive the body to lift or lower, so that the powder collecting unit and the platform are assembled or separated.

In one embodiment of the present disclosure, the powder spreader includes a powder tank configured to receive the powder, and a flexible blade disposed below the powder tank and configured to reciprocate between the working hole and the recycling hole to pave and recycle the powder for forming the shaped object.

In one embodiment of the present disclosure, the platform includes a working collar formed below the working hole and configured to engage with the working tank, and a recycling collar formed below the recycling hole and configured to engage with the recycling tank.

In one embodiment of the present disclosure, the body includes a holder and at least one pedestal, wherein the working tank is movably disposed in the holder, the pedestal is disposed outside the holder, and the recycling tank is disposed on the pedestal.

In one embodiment of the present disclosure, the lifting mechanism includes a lifting rod extending through the base, a spring disposed on the base, and a spring stand disposed between the spring and the body and configured to engage the lifting rod.

In one embodiment of the present disclosure, the powder collecting unit further includes a plate, the shaped object formed on the plate, and the plate is pushed by the lifting rod to move in the working hole and the working tank.

In one embodiment of the present disclosure, the powder collecting unit further includes a stop portion disposed on a bottom of the working tank to block the plate.

In one embodiment of the present disclosure, the moving unit further includes a slide mechanism disposed on the base and configured to drive the powder collecting unit to move horizontally.

In one embodiment of the present disclosure, the slide mechanism includes a slide rail, the body of the powder collecting unit is assembled on the slide rail, and moved between a working position adjacent to the platform of the paving unit and a refueling position remote from the platform of the paving unit.

In one embodiment of the present disclosure, the paving unit further includes a cover disposed on the platform, and a processing hole formed on the cover and located below the laser emitter.

As described above, utilizing the design of the recycling tanks, the remaining powder on the platform can be scraped by the flexible blade to the recycling holes for collecting into the recycling tanks after paving operation. At last, the recycling tanks containing the powder is recovered and replaced with new recycling tanks by drive the lifting mechanism and the slide mechanism of the moving unit, Thus, the purpose of automatic recycling of powder can be achieved.

DETAILED DESCRIPTION OF PREFERRED EMBODIMENTS

The structure and the technical means adopted by the present disclosure to achieve the above and other objects can be best understood by referring to the following detailed description of the preferred embodiments and the accompanying drawings. Furthermore, directional terms described by the present disclosure, such as upper, lower, front, back, left, right, inner, outer, side, longitudinal/vertical, transverse/ horizontal, etc., are only directions by referring to the accompanying drawings, and thus the used directional terms are used to describe and understand the present disclosure, but the present disclosure is not limited thereto.

Figure 1:
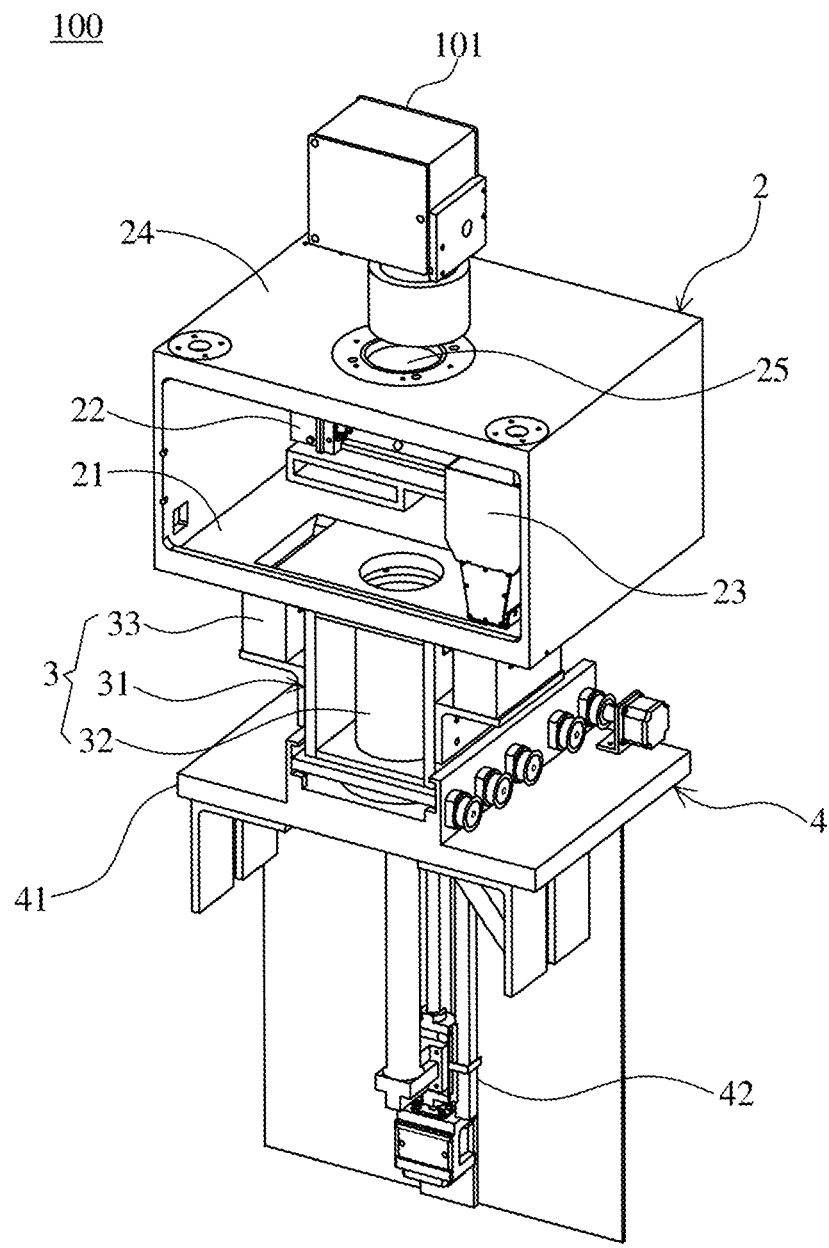
FIG. 1 is a schematic view of a paving apparatus for automatically recycling powder according to a preferred embodiment of the present disclosure.
Figure 2:
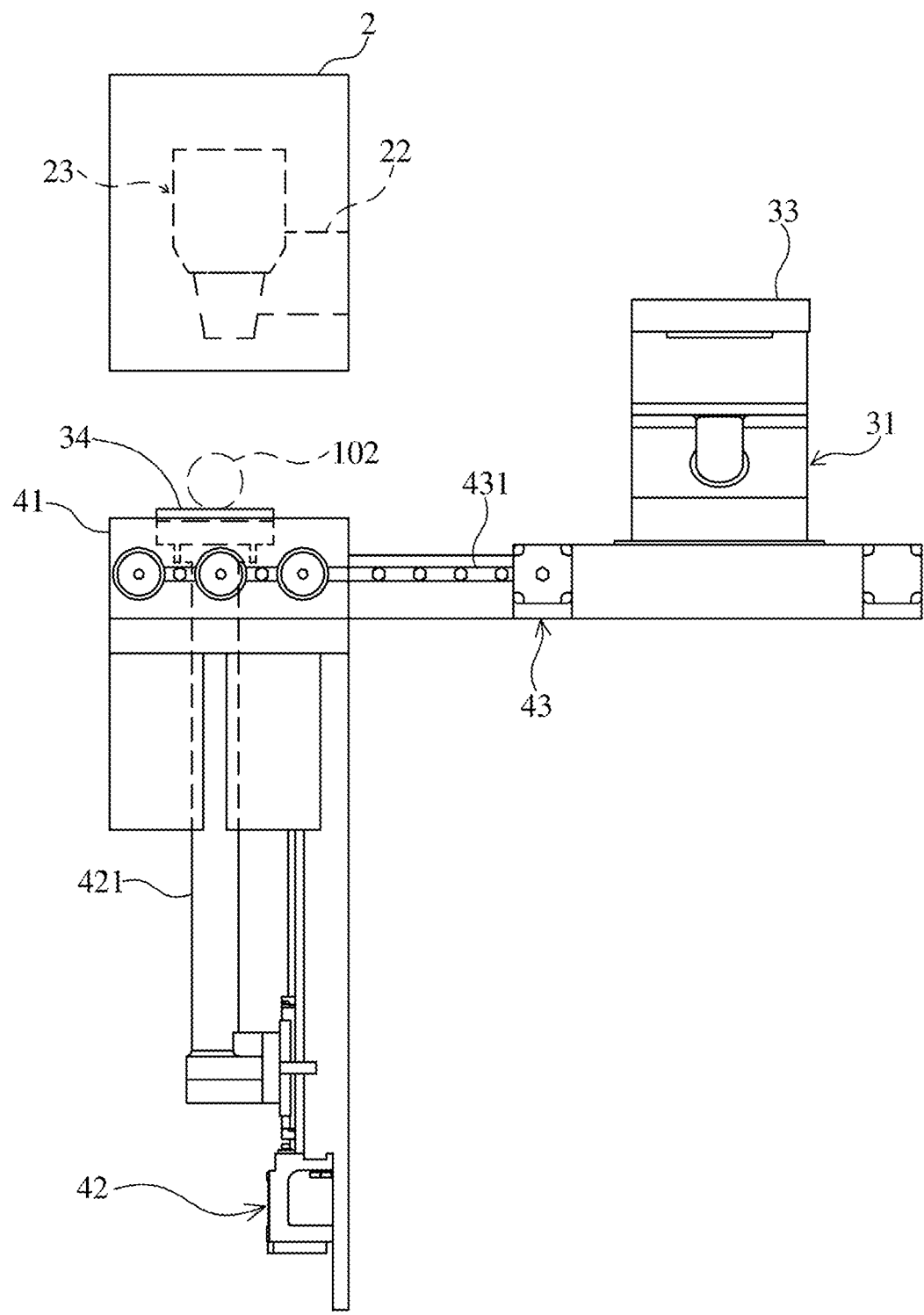
FIG. 2 is a side view of the paving apparatus for automatically recycling powder according to the preferred embodiment of the present disclosure.
Figure 3:
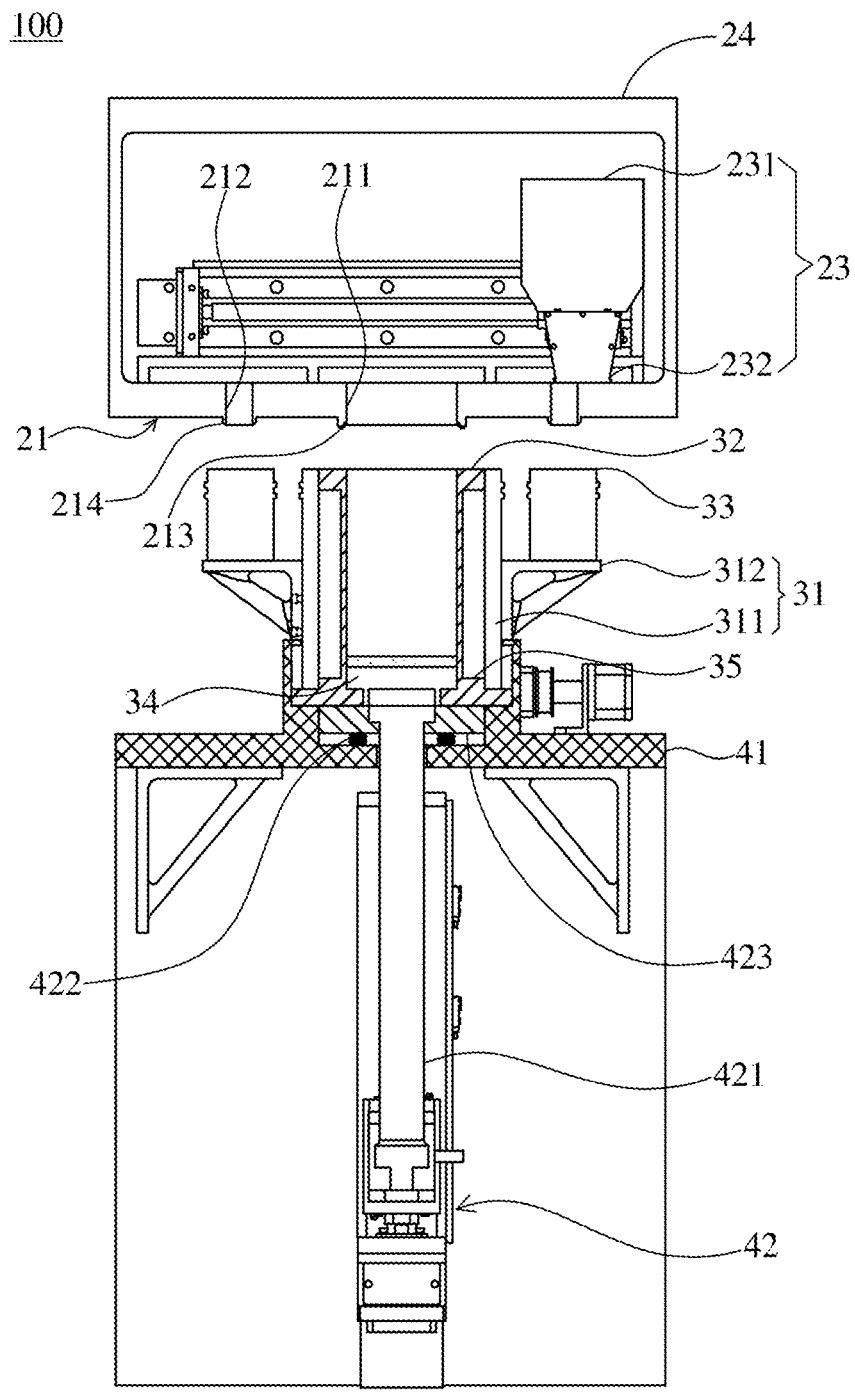
FIGS. 3 to 6 are sectional views of the paving apparatus for automatically recycling powder during an operation according to the preferred embodiment of the present disclosure.

Referring to FIGS. 1 to 3, a paving apparatus for automatically recycling powder according to a preferred embodiment of the present disclosure is illustrated. The paving apparatus 100 is configured to spread powder and recycle the powder in a three-dimensional (3D) printer, and comprises a paving unit 2, a powder collecting unit 3, and a moving unit 4. A detailed structure of each component, assembly relationships, and principles of operation for the present invention will be described in detail hereinafter.

Referring to FIGS. 1 to 3, the paving unit 2 includes a platform 21, a shifter 22, a powder spreader 23, a cover 24, and a processing hole 25, wherein the platform 21 includes a working hole 211, two recycling holes 212, a working collar 213, and two recycling collar 214. The working hole 211 is located at a center of the platform 21, and configured to provide a laser emitter 101 for processing a shaped object 102 with a laser (shown in FIG. 2). The recycling holes 212 are located at the opposite sides of the working hole 211, and configured to recycle the powder. The working collar 213 is formed below the working hole 211. The two recycling collars 214 are formed below the recycling holes 212. The shifter 22 is disposed on the platform 21, and configured to drive the powder spreader 23 to move. The powder spreader 23 is assembled on the shifter 22 and configured to pave the powder on the platform 21. The powder spreader 23 includes a powder tank 231 and a flexible blade 232, wherein the powder tank 231 is configured to receive the powder, and the flexible blade 232 is disposed below the powder tank 231 and configured to reciprocate between the working hole 211 and the recycling holes 212 to pave and recycle the powder for forming the shaped object 102. The cover 24 is disposed on the platform 21, and the processing hole 25 is formed on the cover 24 and located below the laser emitter 101.

Referring to FIGS. 1 to 3, the powder collecting unit 3 is disposed below the platform 21, and the powder collecting unit 3 includes a body 31, a working tank 32, two recycling tanks 33, a plate 34, and a stop portion 35, shown in FIG. 3. The body 31 includes a holder 311 and two pedestals 312, wherein the two pedestals 312 are disposed at outside of the holder 311, the working tank 32 corresponds to the working hole 211 and is movably disposed in the holder 311. In addition, the working tank 32 is configured to accommodate the shaped object 102, and the working collar 213 is configured to engage with the working tank 32, The two recycling tanks 33 are disposed on the pedestals 312 of the body 31, and the two recycling tanks 33 correspond to the recycling holes 212, respectively. The two recycling collars 214 are engaged with the recycling tanks 33, respectively. The shaped object 102 is formed on the plate 34 through paving layer by layer with the laser. The stop portion 35 is disposed on a bottom of the working tank 32 to block the plate 34.

Referring to FIGS. 1 to 3, the moving unit 4 includes a base 41, a lifting mechanism 42, and a slide mechanism 43, wherein the lifting mechanism 42 is disposed on the base 41 and configured to drive the body 31 to lift or lower, so that the working tank 32 and the recycling tanks 33 of the powder collecting unit 3 are assembled or separated with the platform 21. The lifting mechanism 42 includes a lifting rod 421, a spring 422, and a spring stand 423, wherein the lifting rod 421 extends through the base 41, the spring 422 is disposed on the base 41, and the spring stand 423 is disposed between the spring 422 and the body 31, the spring stand 423 is configured to engage the lifting rod 421. The plate 34 is pushed by the lifting rod 421 to move in the working hole 211 and the working tank 32. Shown in FIGS. 1 and 2, the slide mechanism 43 is disposed on the base 41 and configured to drive the powder collecting unit 3 to move horizontally, wherein the slide mechanism 43 includes a slide rail 431, the body 31 of the powder collecting unit 3 is assembled on the slide rail 431, and moved between a working position adjacent to the platform 21 of the paving unit 2 and a refueling position remote from the platform 21 of the paving unit 2.

Figure 4:
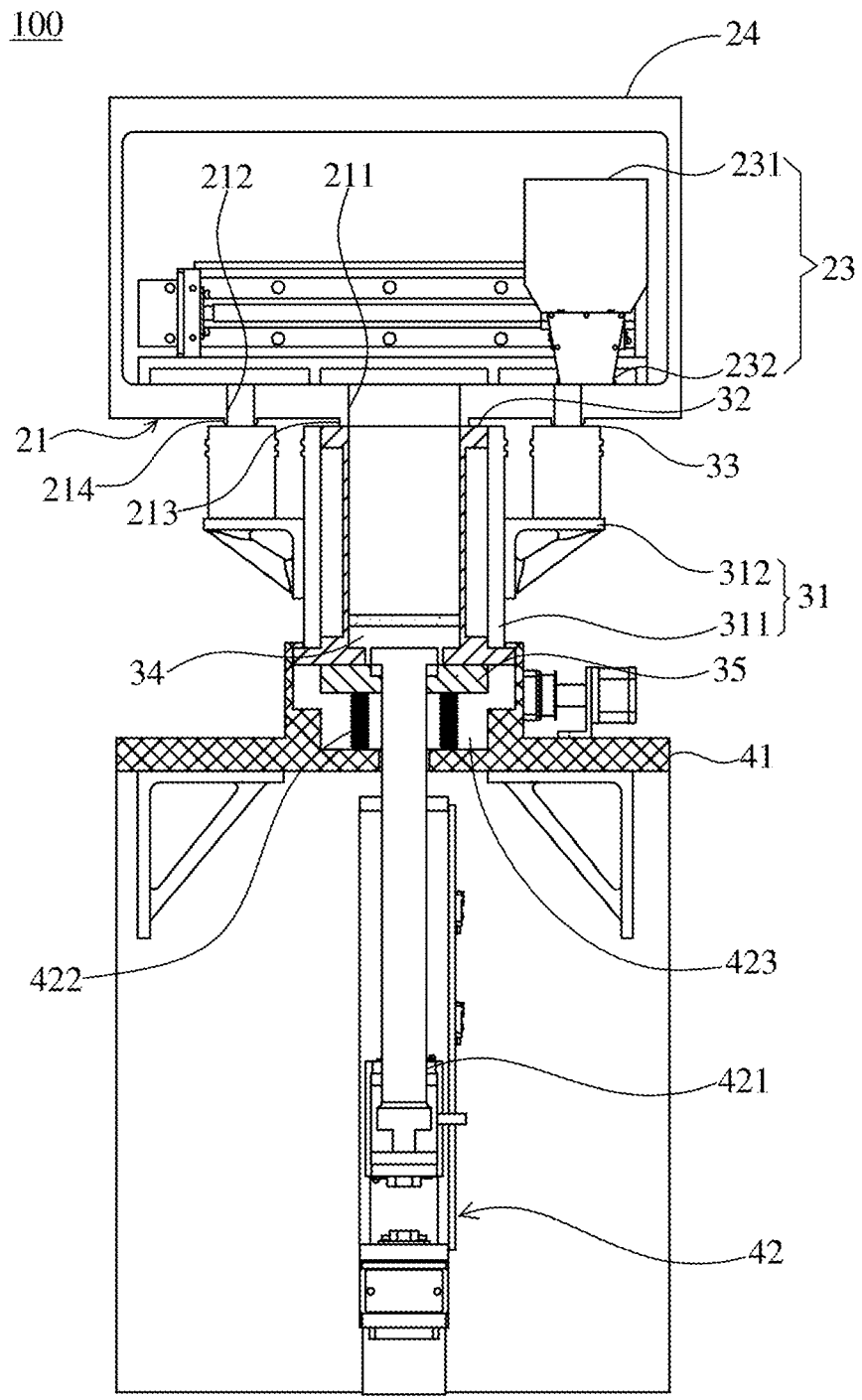
Figure 5:
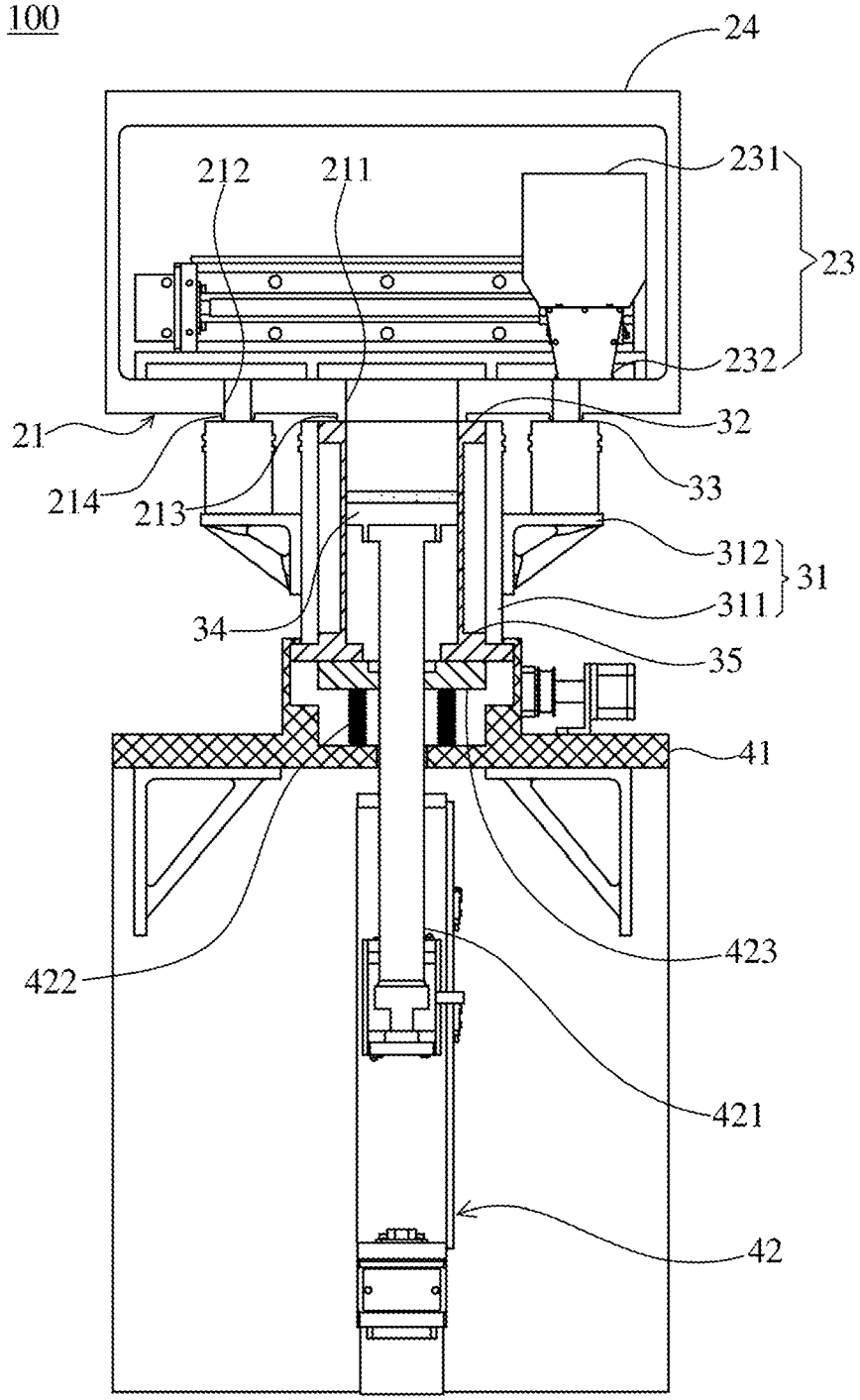
Figure 6:
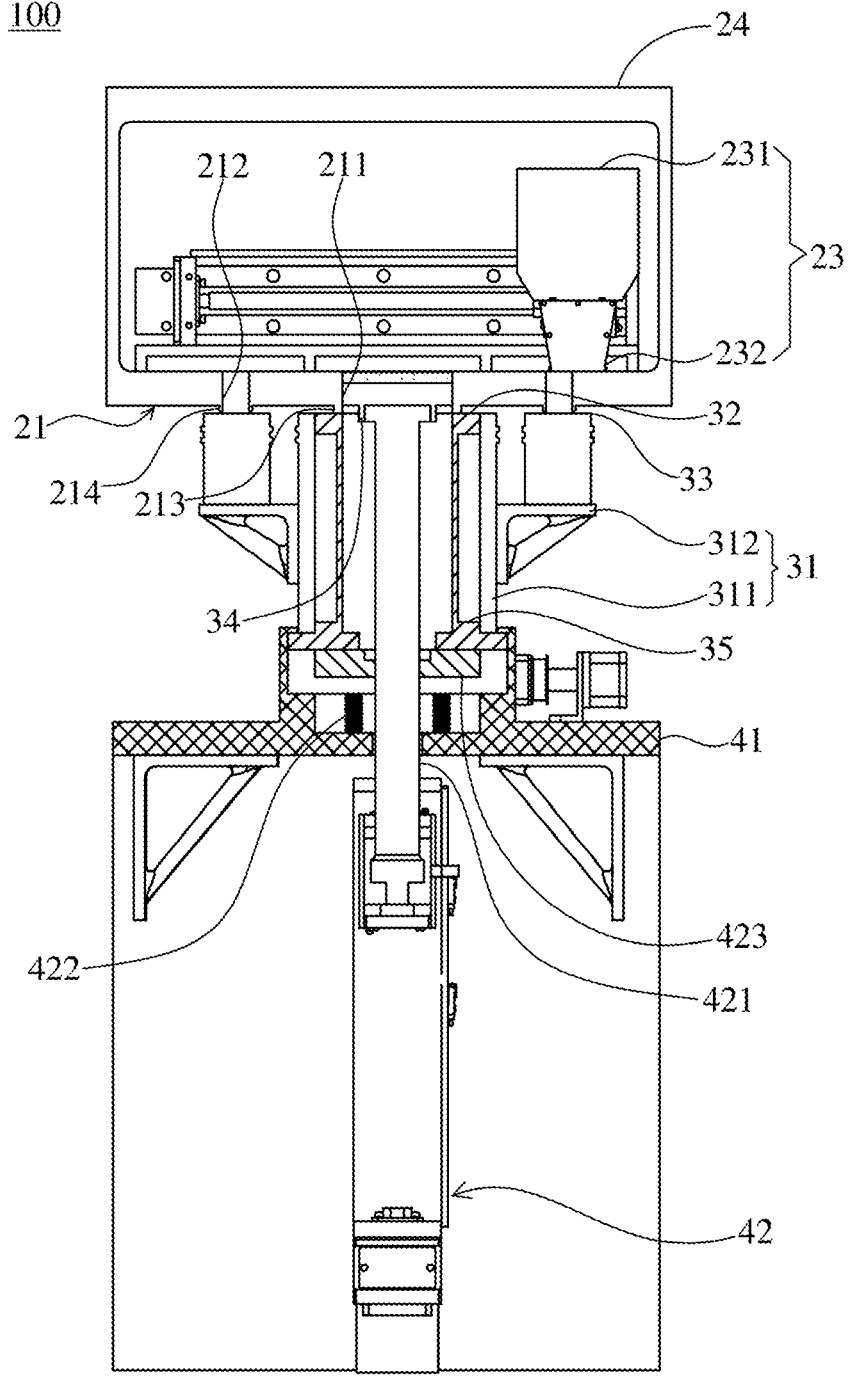

Referring to FIGS. 3 to 6, according to the described structure, when preparing to process a paving operation, the body 31 of the powder collecting unit 3 is moved toward the platform 21 of the paving unit 2 from the refueling position shown in FIG. 2 to the working position, so that the body 31 is located above the base 41. As shown in FIG. 3, the lifting rod 421 of the lifting mechanism 42 is pushed up, so that the body 31 is moved up. At the same time, an elastic restoring force of the spring 422 push the spring stand 423, so that the holder 311 is lifted up. The working tank 32 and the recycling tanks 33 are pushed up and engaged the working collar 213 and the recycling collars 214, respectively. As shown in FIG. 4, the lifting rod 421 continues to lift up, and pushes up the plate 34 located in the working tank 32. As shown in FIG. 5, the plate 34 passes through the working tank 32 and moves to the platform 21. As shown in FIG. 6, the plate 34 stays in the working hole 211, and the plate 34 and the platform 21 are located in the same plane. Then, it is started to pave layer by layer and process a laser operation to form the shaped object 102. At the end, the powder on the platform 21 is scraped by the flexible blade 232 to the recycling holes 212, and the powder is collected into the recycling tanks 33. At last, the recycling tanks 33 containing the powder is recovered and replaced with new recycling tanks 33 by driving the lifting mechanism 42 and the slide mechanism 43 of the moving unit 4, Thus, the purpose of automatic recycling of powder can be achieved.

As described above, utilizing a design of the recycling tanks 33, the remaining powder on the platform 21 can be scraped by the flexible blade 232 to the recycling holes 212 for collecting into the recycling tanks 33 after the paving operation. At last, the recycling tanks 33 containing the powder is recovered and replaced with the new recycling tanks 33 by driving the lifting mechanism 42 and the slide mechanism 43 of the moving unit 4. Thus, the purpose of automatic recycling of powder can be achieved.

The present disclosure has been described with preferred embodiments thereof and it is understood that many changes and modifications to the described embodiments can be carried out without departing from the scope and the spirit of the invention that is intended to be limited only by the appended claims.

What is claimed is:

1. A paving apparatus for automatically recycling powder, configured to spread powder and recycle the powder in a three-dimensional (3D) printer, comprising:
   a paving unit including a platform, a shifter disposed on the platform, and a powder spreader assembled on the shifter and configured to pave the powder on the platform, wherein the platform includes a working hole configured to provide a laser emitter for processing a shaped object, and at least one recycling hole configured to recycle the powder;

a powder collecting unit disposed below the platform, wherein the powder collecting unit includes a body, a working tank disposed on the body and corresponding to the working hole for receiving the shaped object, and at least one recycling tank disposed on the body and corresponding to the at least one recycling hole; and a moving unit including a base and a lifting mechanism, wherein the lifting mechanism is disposed on the base and configured to drive the body to lift or lower, so that the powder collecting unit and the platform are assembled or separated.

2. The paving apparatus according to claim 1, wherein the powder spreader includes a powder tank configured to receive the powder, and a flexible blade disposed below the powder tank and configured to reciprocate between the working hole and the recycling hole to pave and recycle the powder for forming the shaped object.

3. The paving apparatus according to claim 1, wherein the platform includes a working collar formed below the working hole and configured to engage with the working tank, and a recycling collar formed below the recycling hole and configured to engage with the recycling tank.

4. The paving apparatus according to claim 1, wherein the body includes a holder and at least one pedestal, wherein the working tank is movably disposed in the holder, the pedestal is disposed outside the holder, and the recycling tank is disposed on the pedestal.

5. The paving apparatus according to claim 1, wherein the lifting mechanism includes a lifting rod extending through the base, a spring disposed on the base, and a spring stand disposed between the spring and the body and configured to engage the lifting rod.

6. The paving apparatus according to claim 5, wherein the powder collecting unit further includes a plate, the shaped object formed on the plate, and the plate is pushed by the lifting rod to move in the working hole and the working tank.

7. The paving apparatus according to claim 6, wherein the powder collecting unit further includes a stop portion disposed on a bottom of the working tank to block the plate.

8. The paving apparatus according to claim 1, wherein the moving unit further includes a slide mechanism disposed on the base and configured to drive the powder collecting unit to move horizontally.

9. The paving apparatus according to claim 1, wherein the slide mechanism includes a slide rail, the body of the powder collecting unit is assembled on the slide rail, and moved between a working position adjacent to the platform of the paving unit and a refueling position remote from the platform of the paving unit.

10. The paving apparatus according to claim 1, wherein the paving unit further includes a cover disposed on the platform, and a processing hole formed on the cover and located below the laser emitter.

* * * * *